United States Patent [19]

Hooykaas

[11] Patent Number: 5,395,443
[45] Date of Patent: Mar. 7, 1995

[54] METHOD FOR PREPARING A CEMENT BASE MATERIAL, TOGETHER WITH A CEMENT COMPOSITION CONTAINING THIS BASE MATERIAL

[75] Inventor: Carel W. J. Hooykaas, Rotterdam, Netherlands

[73] Assignee: Pelt & Hooykass B.V., Rotterdam, Netherlands

[21] Appl. No.: 243,616

[22] Filed: May 16, 1994

Related U.S. Application Data

[63] Continuation of Ser. No. 84,817, Jun. 30, 1993, abandoned.

[30] Foreign Application Priority Data

Jul. 14, 1992 [NL] Netherlands .......................... 9201266

[51] Int. Cl.⁶ .................................................. C04B 5/00
[52] U.S. Cl. .................................... 106/789; 106/707; 106/767; 106/769; 75/434; 75/560
[58] Field of Search ................ 106/767, 769, 789, 707; 75/318, 319, 322, 434, 560

[56] References Cited

U.S. PATENT DOCUMENTS

| | | | |
|---|---|---|---|
| 2,471,562 | 3/1946 | Fitterer | 75/434 |
| 4,174,961 | 11/1979 | Wolfs et al. | 75/434 |
| 4,652,310 | 3/1987 | Tormari et al. | 65/19 |

FOREIGN PATENT DOCUMENTS

| | | |
|---|---|---|
| 993661 | 7/1976 | Canada . |
| 396025 | 5/1924 | Germany . |
| 7045809 | 9/1982 | Japan . |
| 1048471 | 3/1986 | Japan . |
| 1048475 | 3/1986 | Japan . |
| 75130 | 6/1976 | Luxembourg . |
| 6407649 | 1/1965 | Netherlands . |
| 7712077 | 5/1979 | Netherlands . |
| 1580607 | 12/1980 | United Kingdom . |

Primary Examiner—Mark L. Bell
Assistant Examiner—David Sample
Attorney, Agent, or Firm—Levine & Mandelbaum

[57] ABSTRACT

The invention relates to a method for preparing a hydraulically settable cement base material starting from steel slags formed in a steel-making process, which method comprises the formation, in steel slags in the liquid state, of a ferrite gradient by adding a ferrite-precipitating compound, the separation, if required, of the high-ferrite fraction formed, the separation of at least the low-ferrite fraction formed, the cooling and the comminution thereof to obtain a hydraulically settable material. The ferrite-precipitating compound used has preferably acid components, and can expediently generate silicic acid. At least before the cooling of the low-ferrite fraction, the aluminum content of the liquid slag material is regulated by the addition of an aluminate-containing material, such as bauxite. The high-ferrite fraction separated can be returned to the steel-making process to reduce or remove the addition of a flux in the production of steel.

6 Claims, No Drawings

METHOD FOR PREPARING A CEMENT BASE MATERIAL, TOGETHER WITH A CEMENT COMPOSITION CONTAINING THIS BASE MATERIAL

This application is a continuation of application Ser. No. 08/084,817, filed on Jun. 30, 1993, now abandoned.

BACKGROUND OF THE INVENTION

The invention relates to a method for preparing a hydraulically settable cement base material starting from steel slags formed in a steel-making process.

Steel slags have hitherto mainly been used solely as a filler in a road-building material.

Although there is a silicate and an aluminate fraction present in steel slags, binding properties of steel slags when used as aggregate in concrete have never been observed.

However, steel slags contain several mineral fractions which are important for application as binders:
 alite: C3S
 belite: C2S
 celite: C3A
 brownmillerite: C4AF
where $C=CaO$, $S=SiO_2$, $A=Al_2O_3$ and $F=Fe_2O_3$.

Steel slags usually contain much C3S, C2S and C4AF, but little C3A. The large amount of ferrites, in particular, has, however, proved disadvantageous in rendering the slag material suitable for use as a hydraulic binder.

SUMMARY OF THE INVENTION

A method has now been found which overcomes this problem and by means of which a cement base material can be prepared starting from steel slags formed in a steel-making process.

The method according to the invention more particularly comprises the formation, in steel slags in the liquid state, of a ferrite gradient by adding a ferrite-precipitating compound, the separation, if required, of the high-ferrite fraction formed, the separation of at least the low-ferrite fraction formed, the cooling and the comminution thereof to obtain a hydraulically settable material.

It should be noted that during the addition of the ferrite-precipitating compound to the steel slags in the molten state it is necessary to ensure good mixing of the constituents, so that a homogeneous mixture is obtained.

If good mixing leaves something to be desired, a good blend, in which the added substances, if required, are dissolved in the molten steel slags or at least upon cooling are incorporated in the crystal lattice, can be obtained by injecting a gaseous medium into the molten steel slags via a tube or lance.

Said gaseous medium can be an inert gas, such as nitrogen, but may alternatively be an oxidant such as oxygen. The choice of the gaseous medium to be used primarily depends on the type of the added compound: the dissolution or the mixing of compounds may take place, namely, exothermally or endothermally.

In the case of an exothermal reaction, no energy or less energy has to be supplied and homogenisation of the mixture can take place using an inert gas; in the case of an endothermal reaction, however, the dissolution will in general remove much energy from the molten steel slags, whereby the temperature of the mixture is considerably decreased and homogenisation becomes more difficult or impossible. To overcome this, the homogenisation of the mixture should be carried out with an oxidant such as oxygen, in which process the fuel required for the combustion can be present in the liquid slag or else should be added, for example carbon.

In the case of an endothermal reaction, an oxidant will be supplied to support the reaction. If, however, too little oxidant is supplied, a temperature decrease of the steel slags will take place. Decrease of the temperature from, usually, 1400° C. to approximately 1100° C. results, however, in the mass of molten steel slags becoming too "syrupy" and consequently the mass can no longer be "stirred" by injecting gas. Although the viscosity of the slag material can be maintained by adding fluorspar ($CaF_2$) or another fluoride source, the fluoride then present in the slags leads to emission of fluorine into the environment and is therefore extremely undesirable.

The ferrite gradient is preferably formed in the absence of liquid steel, i.e. not in the steel converter, in order to prevent any impact on the steel quality.

The ferrite-precipitating compound used is expediently a material having acid components. Thereby, the slags are made more acidic (reduced). Iron present in the form of ferrite passes into the metallic phase in the process and, if desired, can be reused directly or after processing in the steelworks or the blast furnace. Surprisingly, it is observed in the process that the melting point of the slag material decreased, which is economically advantageous.

Preferably, the material used having acid components is a material generating silicic acid, chosen from the silica minerals and $SiO_2$. Examples of silica minerals are gravel, sand, and quartz. Other minerals having a high $SiO_2$ content can obviously also be used.

According to a very expedient embodiment of the method according to the invention, at least for the purpose of cooling the low-ferrite fraction, the aluminium oxide content of the liquid slag material is regulated by the addition of an aluminate-containing material. In particular, bauxite is used for this purpose. Of course other natural or synthetic compounds having a high $Al_2O_3$ content can also be used.

As noted above, the ferrite gradient is mainly formed in the absence of steel. This implies that the slags then are in a casting ladle. The addition of aluminate-containing material is not, however, limited to the casting ladle; in principle it is possible to add the aluminate-containing material both during and after the steel-making process.

It should be noted that, in order to obtain good-quality steel, it is very important that the steel slags formed retain good fluidity. If the slags remain fluid for longer, this, namely, has a positive effect with respect to the steel quality, owing to the prolonged exchange period between the constituents. To that end, fluorspar ($CaF_2$) or another fluoride source is usually added. Surprisingly, it has now been found that the same effect is achieved by adding aluminate-containing material during the steel-making process. This means that less or even no addition of fluorspar at all is now required, and that, at the same time, the emission of fluorine has decreased or is completely absent. It was found, moreover, that as a result of the addition of aluminate-containing material during the steel-making process the amount of ferrites in the slag material had been reduced; to render the slag material thus obtained suitable as a cement base material, it is therefore sufficient to use a smaller amount of ferrite-precipitating compound for the purpose of forming the ferrite gradient according to the invention, or said addition may even be superfluous.

It is to be noted that the addition of silicic acid and aluminium oxide to steel slags is known per se from Dutch patent application 64.07649 and serves to keep as low as possible the free lime component in the slag. In this process, the slags are heated in a casting ladle to from 250° to 400° C. above their melting point. On the basis of the ternary diagram appended to said publication it is suggested that, starting from steel slags, compositions can be formed in the field of blast-furnace slags and that therefore the slags could be used for all the hitherto well-tried applications of blast-furnace slags. The ternary diagram, however, relates solely to the $CaO—SiO_2—Al_2O_3$ system and takes no account at all of the presence of iron compounds or ferrites in steel slags. It is precisely the high content of iron compounds which makes it impossible to render steel slags equivalent in all respects to blast-furnace slags exclusively by changing the free-lime content.

In contrast, the invention provides a method which overcomes the drawback of the iron or iron compounds present and which, moveover, makes a part or all of the total amount of iron present suitable again for returning to the steel-making process.

According to a very particular variant of the process according to the invention, the ferrite gradient is formed by the addition of ground, granulated blast-furnace slag or fly ash. As a result of the $SiO_2$ content of such material, the addition thereof will have to take place outside the steel-making process, i.e. in the casting ladle or the like.

As already explained above, the high-ferrite fraction separated is returned to the steel-making process. In particular, the high-ferrite fraction is formed by the addition of silicate-containing material to the liquid slags, outside the steel-making process. In principle it is, however, also possible to reduce the iron/ferrite content in the slags even during the steel-making process by the addition of aluminium, preferably as aluminate. It was found, surprisingly, that even then a ferrite gradient is formed; however, the high-ferrite fraction, which is heavier and therefore sinks downwards, is utilised directly in the converter or blast furnace. Moreover, the steel slags were found to be more fluid as a result of the addition of aluminate, which makes the conventional addition of a fluoride source superfluous. The aluminate added is preferably bauxite.

A high-ferrite fraction formed outside the steel-making process will obviously have the same effect as explained hereinbefore. The invention therefore likewise relates to the use of a high-ferrite steel slag fraction, which has been formed according to the method of the invention, as a flux in the production of steel.

The invention further relates to a cement composition which has been obtained using a steel slag which has been treated according to the method of the invention.

According to the invention a modification is carried out, as explained, of not only the ferrite content present in steel slags but also of the $SiO_2$ and/or $Al_2O_3$ content. It was found that the adjustment of the $SiO_2$ content to, for example, 20–25%, and of the $Al_2O_3$ content to, for example, 3–6% provides a steel slag having the same binding properties as those of Portland cement; in this context it should be noted, of course, that for this application the high-ferrite, lowermost fraction from the casting ladle has been separated as well as possible from the uppermost, low-ferrite fraction, and the low-ferrite fraction is used as the cement base material.

The various compounds are preferably added in the comminuted state. Per se, a small particle size will be beneficial for rapid mixing and/or dissolution of the particles in the molten steel slags. Too small a particle size may however be disadvantageous because, in that case, owing to the sudden heating of the air around the particles, said particles may be blown off the slag surface.

Constituents are expediently added in the form of particles having a maximum dimension of less than 5 mm, preferably less than 0.9 mm.

The invention will now be illustrated by means of a number of exemplary embodiments.

EXAMPLE 1

The starting material is steel slags which contain 43% CaO, 18% $SiO_2$ and 2.5% $Al_2O_3$. Said steel slags are admixed, at a temperature of approximately 1350° C., with a quantity of sand particles so as to increase the $SiO_2$ content to 22%, and with bauxite particles so as to obtain 4% $Al_2O_3$.

The size of the added particles was not more than 0.9 mm.

During the addition, the molten steel slags were stirred by introducing a gas mixture of $N_2$ and $O_2$, in such a way that the temperature did not drop below approximately 1100° C.

After the added particles had been dissolved in the molten steel slags, the steel slags were cooled in air and ground to a particle size of approximately 0.09 mm which is a usual size for cement.

The use of finely ground steel slags, thus obtained, as a hydraulic binder gave results comparable to Portland cement.

EXAMPLE 2

The starting material used was steel slags having the same composition as in Example 1, but the steel slags in the molten state were admixed, at a temperature of approximately 1200° C. and with the introduction of nitrogen gas, with such an amount of ground, granulated blast-furnace slags that the $SiO_2$ content of the steel slags became approximately 20%.

After cooling and grinding finely, a steel slag powder was obtained which, when used as a hydraulic binder, had excellent flexural strength and compression strength after setting for 28 days.

Replacing ground, granulated blast-furnace slags by fly ash gave comparable results.

EXAMPLE 3

The starting material was the same steel slags as in Example 1, which were admixed, while the slags were in the casting ladle, with an amount of finely ground corundum particles. After the molten mass was kept at an elevated temperature for some time, the lowermost fraction, which contained much precipitated ferrites, was separated and returned to the blast furnace.

The remaining amount of molten slags was admixed with a quantity of bauxite particles. After cooling and grinding finely to the fineness of cement, a hydraulically settable binder composition was obtained having excellent setting properties.

EXAMPLE 4

The starting material was the same steel slags as in Example 1, which were admixed, while the molten steel slags were in the casting ladle, both with an amount of finely ground corundum particles and bauxite particles.

The lowermost fraction was separated and directly, as such, returned to the blast furnace. It was found that the addition of this fraction made the addition of fluorspar unnecessary, because the viscosity of the slags in the blast furnace remained adequate.

The uppermost fraction was processed as specified in Example 3 to give a cement base material having properties as good.

EXAMPLE 5

In a steel converter, the slag mass floating on top was admixed with a quantity of finely ground bauxite particles in order to increase the aluminium oxide content /f the slags. After the slag mass had been poured out into a casting ladle and been cooled, it was found that the amount of ferrites was distinctly less than without the addition of bauxite. The addition of bauxite therefore resulted in an improvement of the yield of the steel-making process. Moreover, the slag mass remained fluid for longer.

What is claimed is:

1. A method for preparing a hydraulically settable cement base material and a flux for steel making starting from steel slags formed in a steel-making process, which method comprises the steps of adding an aluminate-containing material to the liquid slag material in the steel making vessel, separating the thus obtained slag material, forming a ferrite gradient in the obtained slags in the liquid state, in the absence of liquid steel, by adding a ferrite-precipitating compound, to obtain a high-ferrite fraction and a low-ferrite fraction, separating the low-ferrite fraction from the high ferrite fraction, cooling and comminuting the low ferrite fraction to obtain said hydraulically settable cement base material, and adding a flux to the steel making process by returning the high-ferrite fraction thereto.

2. A method according to claim 1, wherein the ferrite-precipitating compound used is a material having acid components.

3. A method according to claim 2, wherein the ferrite precipitating compound is a material generating silicic acid, selected from the group consisting of silica mineral and $SiO_2$.

4. A method according to claim 3, wherein the silica mineral used is selected from the group consisting of sand and quartz.

5. A method according to claim 1, wherein the aluminate-containing material used is bauxite.

6. A method according to claim 1, wherein the ferrite gradient is formed by the addition of fly ash or of ground, granulated blast-furnace slag.

* * * * *